United States Patent
Gentle et al.

(10) Patent No.: US 8,107,596 B1
(45) Date of Patent: Jan. 31, 2012

(54) APPARATUS AND METHOD FOR PROVIDING ON-HOLD INFORMATION BASED ON PREFERENCE OF USER

(75) Inventors: Christopher Reon Gentle, Gladesville (AU); Lisa Yoshiko Kawahara, Colorado Springs, CO (US); Ashis Kumar Maity, Arvada, CO (US); Michael John Thomas, Denver, CO (US)

(73) Assignee: Avaya Inc., Basking Ridge, NJ (US)

( * ) Notice: Subject to any disclaimer, the term of this patent is extended or adjusted under 35 U.S.C. 154(b) by 1330 days.

(21) Appl. No.: 11/321,305

(22) Filed: Dec. 29, 2005

(51) Int. Cl.
*H04M 11/00* (2006.01)
*H04M 1/00* (2006.01)

(52) U.S. Cl. .......................................... 379/52; 379/393

(58) Field of Classification Search ............. 379/215.01, 379/88.22, 52, 76, 162, 55.1, 56.1, 56.2, 379/56.3, 393; 348/15
See application file for complete search history.

(56) References Cited

U.S. PATENT DOCUMENTS

| 5,253,285 | A  | * | 10/1993 | Alheim ........................... 379/52 |
| 6,188,429 | B1 | * | 2/2001  | Martin et al. ............... 348/14.08 |
| 6,400,804 | B1 | * | 6/2002  | Bilder ............................. 379/76 |
| 6,501,779 | B1 | * | 12/2002 | McLaughlin et al. .......... 372/52 |
| 6,690,770 | B2 | * | 2/2004  | Brandt ............................ 379/52 |
| 6,934,376 | B1 | * | 8/2005  | McLaughlin et al. ... 379/212.01 |
| 7,403,605 | B1 | * | 7/2008  | Day ............................. 379/162 |
| 2002/0136384 | A1 | * | 9/2002 | McCormack et al. ... 379/215.01 |
| 2004/0137944 | A1 | * | 7/2004 | Lee et al. ..................... 455/557 |

* cited by examiner

*Primary Examiner* — Ahmad Matar
*Assistant Examiner* — Sonia Gay
(74) *Attorney, Agent, or Firm* — John C. Moran

(57) ABSTRACT

A method and apparatus for providing on-hold information to a telecommunication terminal that has been placed on-hold during a telecommunication call by receiving a message designating that the telecommunication terminal is to be placed on-hold from a far-end of the telecommunication call, and transmitting an on-hold message to the user of the telecommunication terminal where the on-hold message is selected by the user and generated at a near-end of the telecommunication call.

12 Claims, 6 Drawing Sheets

APPARATUS AND METHOD FOR PROVIDING ON-HOLD INFORMATION BASED ON PREFERENCE OF USER

TECHNICAL FIELD

This invention relates to telecommunication switching systems, and in particular, to the provision of telecommunication on-hold status information.

BACKGROUND OF THE EMBODIMENTS

Within the prior art, it is common to provide audio information (music or voice) to a party who has been placed on-hold. Of course, given the broad tastes of people, it is hard to provide any type of music that is acceptable to all people. With respect to a voice message being transmitted to a party on-hold, after a period of time, the party may have heard the message multiple times and does not wish to hear this voice message any longer. In addition, certain types of telecommunication transmission protocols do not transport music well. This is particularly true of cellular telecommunication and certain types of IP telephony.

SUMMARY OF THE INVENTION

A method and apparatus for providing on-hold information to a telecommunication terminal that has been placed on-hold during a telecommunication call by receiving a message designating that the telecommunication terminal is to be placed on-hold from a far-end of the telecommunication call, and transmitting an on-hold message to the user of the telecommunication terminal where the on-hold message is selected by the user and generated at a near-end of the telecommunication call.

DETAILED DESCRIPTION

Figure 1:
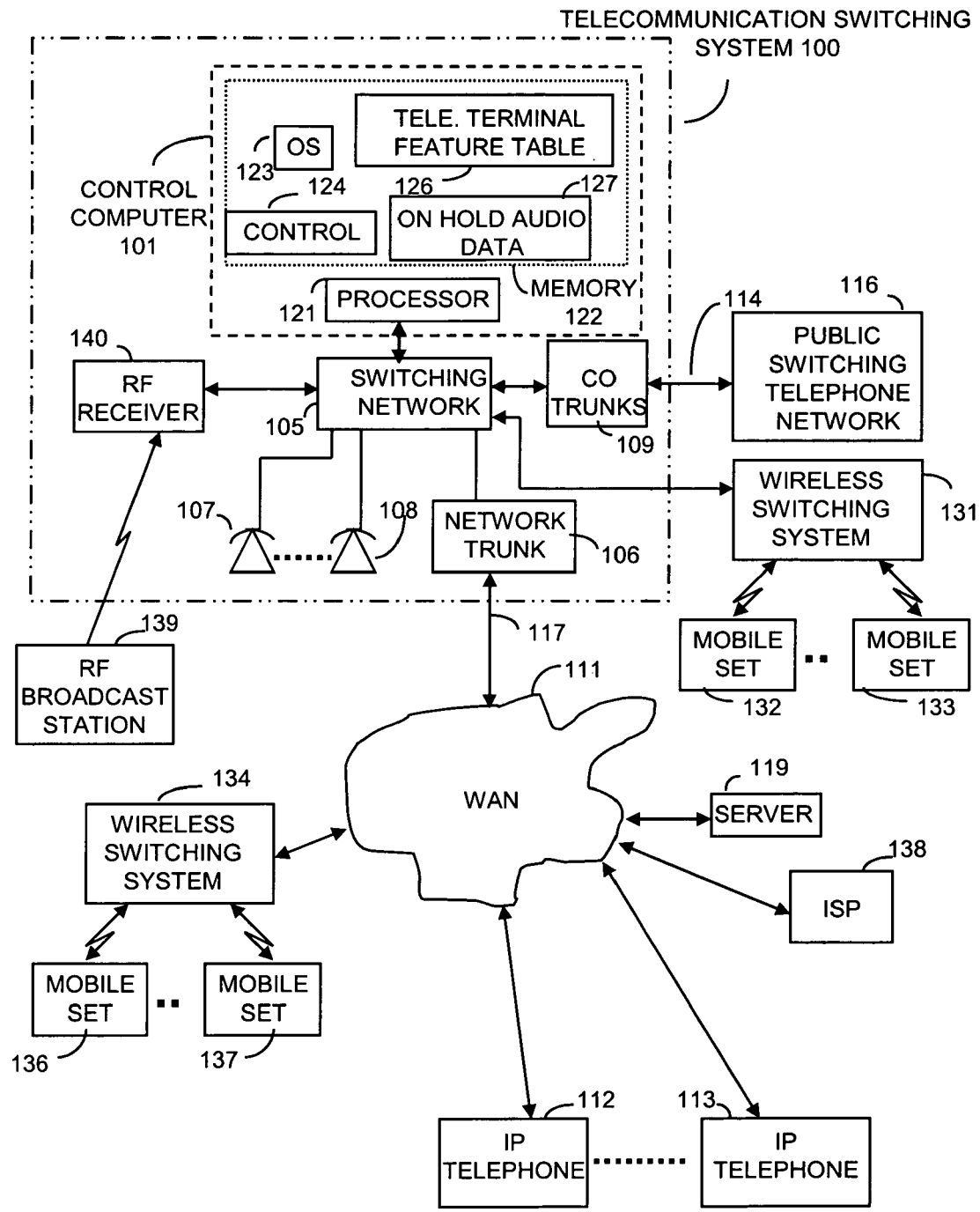
FIG. 1 illustrates, in block diagram form, an embodiment.
Figure 2:
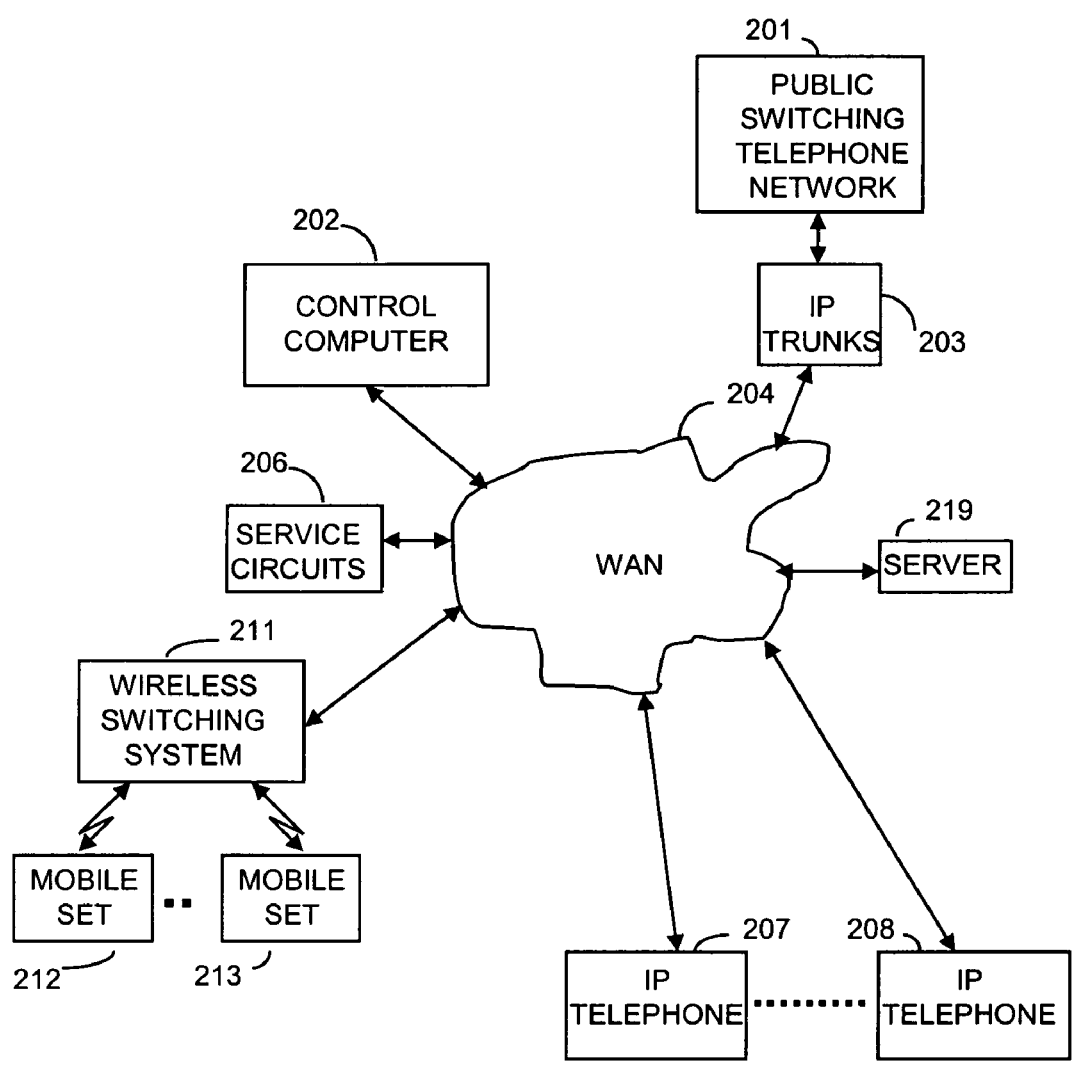
FIG. 2 illustrates, in block diagram form, an embodiment.

FIGS. 1 and 2 illustrate embodiments. In FIG. 1, control computer 101 performs the overall control functions for conventional telephones 107-108 and IP telephone sets 112-113. IP telephone sets 112-113 may be IP telephone set 4624 manufactured by Avaya Inc. or a similar telephone set. Switching network 105 performs the switching of not only audio information but also control information to and from computer 101 to the telephone sets. Telecommunication switching system 100 may obtain information to be use for internal on-hold messages from RF broadcast station 139 via RF receiver 140 or from internet service provider 138 via WAN 111.

Control computer 101 controls the activity of IP telephone sets 112-113 by the transmission of telecommunication terminal status information and the receipt of telecommunication terminal status information from the IP telephone sets via WAN 111. Control computer 101 controls telephones 107-108 by the transmission of telecommunication terminal status and reception of control information via switching network 105.

Control computer 101 comprises processor 121 and memory 122. Processor 121 performs the necessary control functions by executing programs out of memory 122 as well as storing data in memory 122. Overall control of computer 101 is performed by operating system 123. Control routine 124 performs the overall telecommunication control.

Telecommunication terminal feature table 126 is a series of telecommunication terminal feature tables, one for each telephone, interconnected to telecommunication switching system 101 whether the telephone be a digital, analog, or IP telephone. When control computer 101 is providing audio information for a connected telephone that has been placed on-hold, feature table 126 designates if the telephone is to receive customized on-hold information. The on-hold information may be audio or multi-media information. In addition, the on-hold information may be textual information that is presented to a user via a TTY terminal. If the telephone is to receive customized on-hold information, control computer 101 accesses on-hold audio data 127 to obtain the customized on-hold data. Telephone sets 107-108 can be analog telephone sets, ISDN telephone sets, or proprietary digital protocol telephones sets.

FIG. 2 illustrates another embodiment. Control computer 202 is controlling the operations of IP telephone sets 207-208 with respect to telecommunication operations by the transmission and reception of control information via WAN 204. For a telecommunication call which is only between two IP telephone sets, the IP telephone sets communicate via WAN 204 for the transmission of audio information.

Public switching network 201 is interconnected to WAN 204 via IP trunk 203. The other units of FIG. 2 perform functions similar to similar units of FIG. 1.

Wireless searching system 131 can interface mobile sets 132 through 133 to telecommunication switching system 100 by interconnecting to switching network 105 as is well known in the art. In addition, wireless switching system 134 can interconnect to telecommunication switching system 100 via WAN 111 using techniques well known to those skilled in the art.

Figure 3:
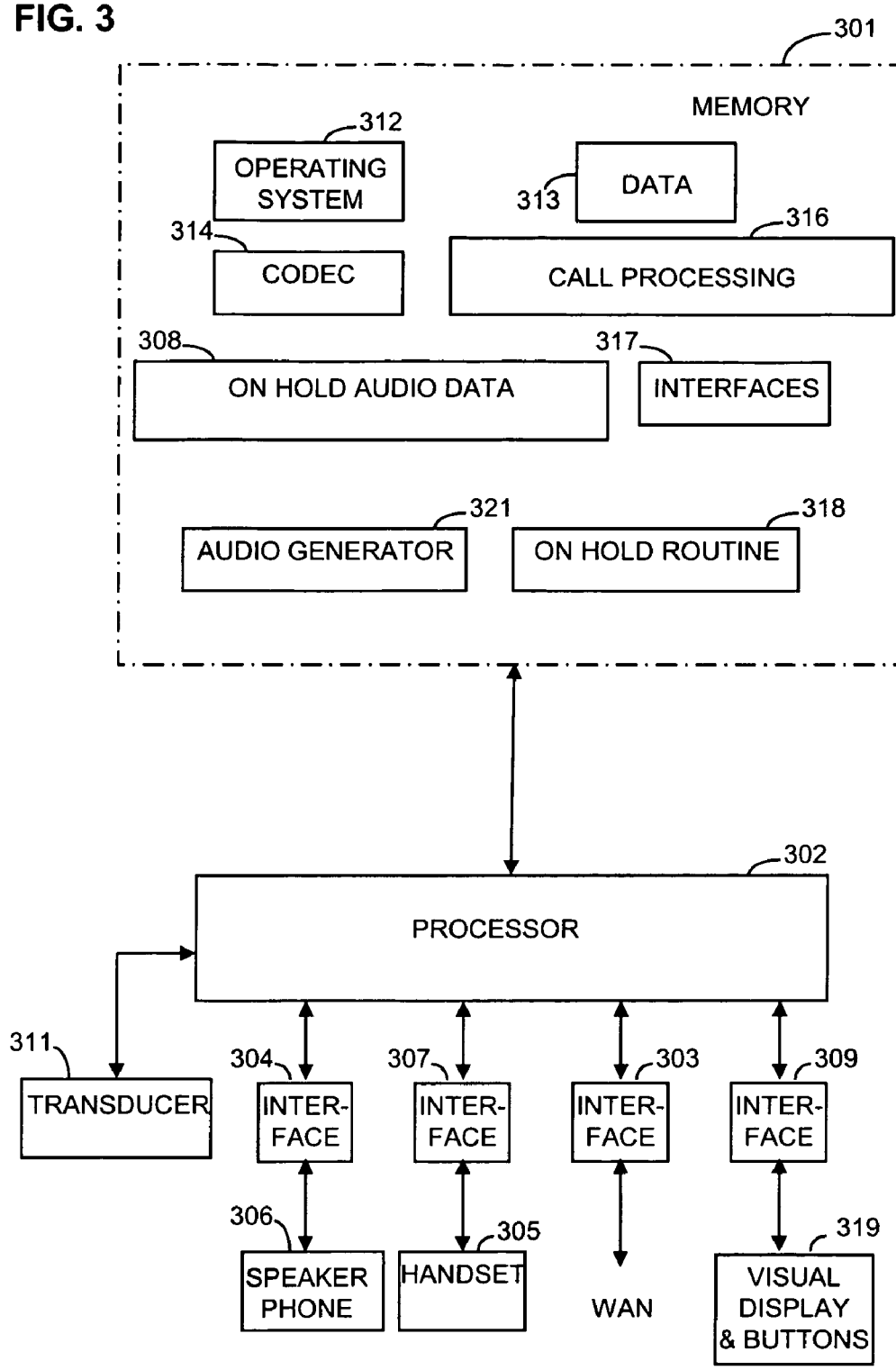
FIG. 3 illustrates, in pictorial form, an embodiment of an IP telephone set.

FIG. 3 illustrates, in block diagram form, one embodiment of IP telephone set 112. Processor 302 provides the overall control for the functions of IP telephone set 112 by executing programs and storing and retrieving data in memory 301. Processor 302 connects to WAN 111 or 204 via interface 303. Processor 302 interfaces to handset 305 via interface 307 and connects to visual display and buttons 319 via interface 309. Visual display and buttons 319 is all of the indicators, buttons keypad, and display used in communication with a user. Processor 302 performs the operations of IP telephone set 112 by executing the routines illustrated in memory 301.

Operating system 312 provides the overall control and the necessary protocol operations. Operating system routine 312 provides all control functions required to implement the TCP/IP protocol as is well known to those skilled in the art. Data is stored in data block 313. CODEC 314 encodes and decodes the audio information for communication with handset 305 or conference speaker and microphone 306 for communication with WAN 111 or 204. Overall control of the call processing is performed by the IP telephone set 112 under the control of call processing routine 316. When IP telephone set 112 is providing customized on-hold information, on-hold routine 318 controls this function by using customized on-hold information stored in on-hold data 308. The communication and control of the various interfaces illustrated in FIG. 3 is provided by interfaces routine 317.

Figure 4:
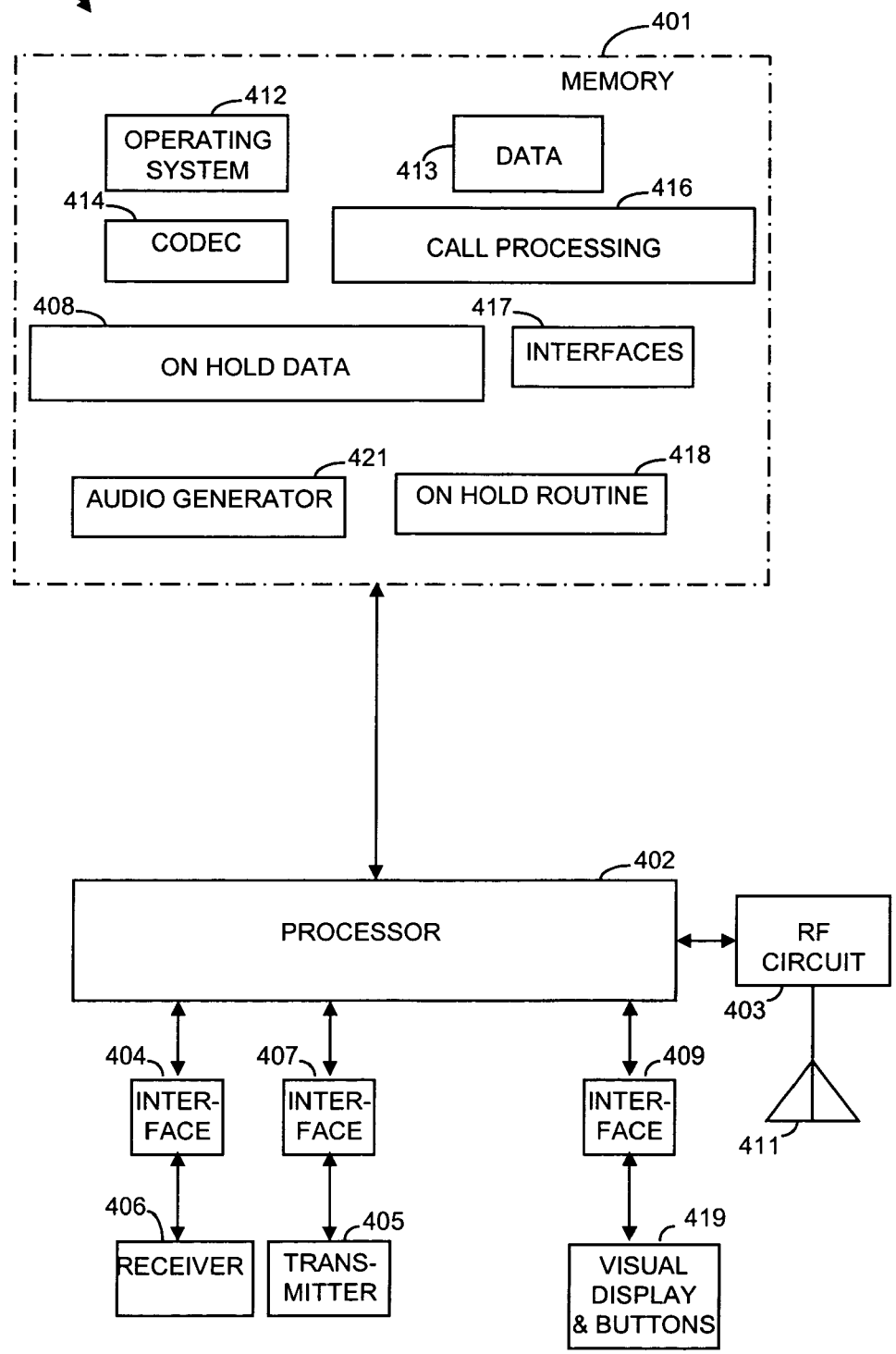
FIG. 4 illustrates, in block diagram form, an embodiment of a mobile set.

FIG. 4 illustrates, in block diagram form, mobile telecommunication terminal 400 also referred to as a cellular telephone or wireless telephone. The functions of software blocks 408, 412-418, and 421 are similar to those performed by software blocks 308, 312-318, and 321 of FIG. 3. Processor 402 performs overall control and is the control controller for the mobile set. Receiver 406 that receives audio information is interfaced to processor 402 via interface 404. Transmitter 405, which transmits audio information, is interfaced to processor 402 via interface 402. Visual display and control buttons utilized by the user of the mobile set are illustrated as block 419 and are interfaced via interface 409 to processor 402. RF circuit 403 in conjunction with antenna 411 performs the necessary RF functions for the mobile set. Processor 402 performs all control functions utilizing application blocks stored in memory 401.

In a first embodiment, a telephone is responsive to an on-hold message to communicate internally generated on-hold information stored within the telephone to the user of the telephone. For example, if IP telephone 112 (near-end of the telecommunication call) is engaged in a telephone conversation with telephone 107 and telephone 107 places IP telephone 112 on-hold, IP telephone 112 is responsive to the on-hold message received either from telephone 107 or telecommunication switching system 100 (far-end of the telecommunication call) to commence to play internally generated on-hold information stored within IP telephone 112. This internally generated on-hold information may be music, or voice or multi-media information and be owned, selected, and loaded by the user. In addition, one skilled in the art would realize that IP telephone 112 could also contain a mechanism for playing music, or voice or multi-media being received via radio frequency waves or the Internet. When IP telephone 112 receives the on-hold release message, it ceases to play the internally generated audio information.

In another embodiment, IP telephone 112 allows the user to listen to the internally generated on-hold information or to accept the audio information being sent from telephone 107 for telecommunication switching system 100. One skilled in the art would realizes that the function described to telecommunication switching system 100 could also be performed by public switching telephone network 116, wireless switching systems 131 and 134 and the apparatus shown on FIG. 2. For example, the server 219 could provide the on-hold generated information.

In another embodiment, the telecommunication switching system controlling the telephone that has just been placed on-hold generates the on-hold information. For example, if telephone 107 and IP telephone 112 are engaged in a conversation and IP telephone 112 (far-end of the telecommunication call) places telephone 107 on-hold, telecommunication switching system 100 is responsive to the on-hold message from IP telephone 112 to transmit on-hold information selected from on-hold data 127 as specified for telephone 107 by telephone terminal feature table 126. (In this example, telephone 107 and telecommunication switching system 100 are the near-end of the telecommunication call.) Each user may individually pre-designate in telephone terminal feature table 126 the on-hold information that will be used. Also, each user may individually load audio information owned by the user into on-hold data 127 for use by the user. In addition, one skilled in the art would recognize that telephone terminal feature table 127 could specify that an external radio frequency broadcast be utilized or an Internet audio service be utilized to provide the on-hold information to telephone 107. One skilled in the art would readily realize that public switching telephone network 116 and the various wireless switching systems could also provide this service to telephone sets or mobile sets interconnected to these systems.

One skilled in the art would readily recognize that mobile sets such as mobile set 132 could also perform the functions of IP telephone 112 in providing internal audio generated on-hold information to the user of the sets when the set was placed on-hold.

In another embodiment, the telecommunication switching system providing the on-hold information could be responsive to button pushes or voice commands from the telephone that has been placed on-hold to toggle between the internal on-hold information and the on-hold information being transmitted by the distant telephone set or its attached telecommunication switching system.

Within the ISDN Q.931 protocol, the on-hold message would be a SUSPEND message, and the on-hold release message would be a RESUME message. As specified in the document by M. Handley, et al. entitled "SIP: Session Initiation Protocol. IETF Request for Comments", RFC 2543, March 1999, the on-hold message would be a RE-INVITE message with the connection address parameter of the connection attribute in the session description (SDP) set to zero. The on-hold release message would be a RE-INVITE message with the original address parameter that had been used to first establish communication.

Figure 5:
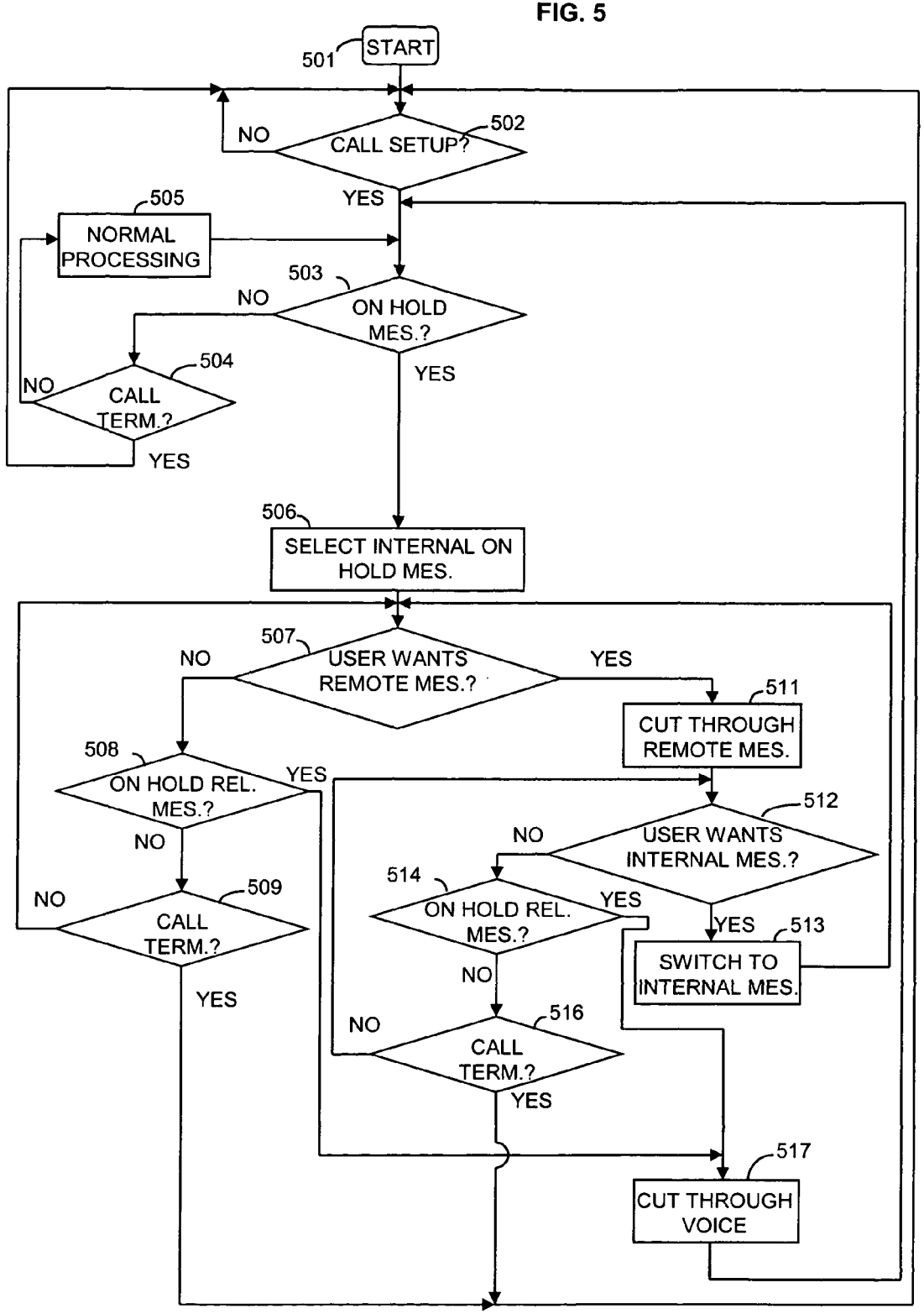
FIG. 5 illustrates, in flow chart form, operations performed by the embodiments.

FIG. 5 illustrates, in flowchart form, operations performed by the embodiments. After being started in block 501, decision block 502 determines if a call is being set up. If the answer is yes, decision block 502 performs the necessary operations for establishing the call before transferring control to decision block 503. If the answer is no in decision block 502, decision block 502 is re-executed.

After receiving control from decision block 502, decision block 503 determines if an on-hold message has been received from the distant telephone. If the answer is no, decision block 504 determines if the call has been terminated. If the call has not been terminated, control is transferred to block 504 which performs normal processing before returning control to block 503. If the answer in decision block 504 is yes, control is transferred to decision block 502. Returning to decision block 503, if the answer in decision block 503 is yes, block 506 selects the internal on-hold message to be played to the local connected telephone.

After selecting the internal hold message, block 506 transfers control to decision block 507. The latter block determines if the user wants to switch over and hear the remote message being transmitted by the distant telephone or distant telephone switching system. If the answer is no in decision block 507, decision block 508 determines if an on-hold release message has been received from the distant end. If the answer is yes in decision block 508, control is transferred to block 517 which cuts through the voice being received from the distant end point before transferring control back to decision block 503. If the answer in decision block 508 is no, decision block 509 determines if the call has been terminated. If the answer is no, control is transferred back to decision block 507. If the answer in decision block 509 is yes, control is transferred back to decision block 502.

Returning to decision block 507, if the answer is yes that the user wants to listen to the remote message rather than the internal on-hold message, control is transferred to block 511 which cuts through the remote message being received from the distant endpoint before transferring control to decision block 512.

Decision block 512 determines if the user wants to switch to the internal on-hold message. If the answer is yes, block 513 switches to the internal on-hold message before transferring control back to decision block 507.

If the answer in decision block 512 is no, decision block 514 determines if an on-hold release message has been received from the distant end point. If the answer is yes, control is transferred to block 517.

If the answer is no in decision block 514, decision block 516 determines if the call has been terminated. If the answer is no, control is transferred to decision block 512. If the answer in decision block 516 is yes, control is transferred back to decision block 502.

Figure 6:
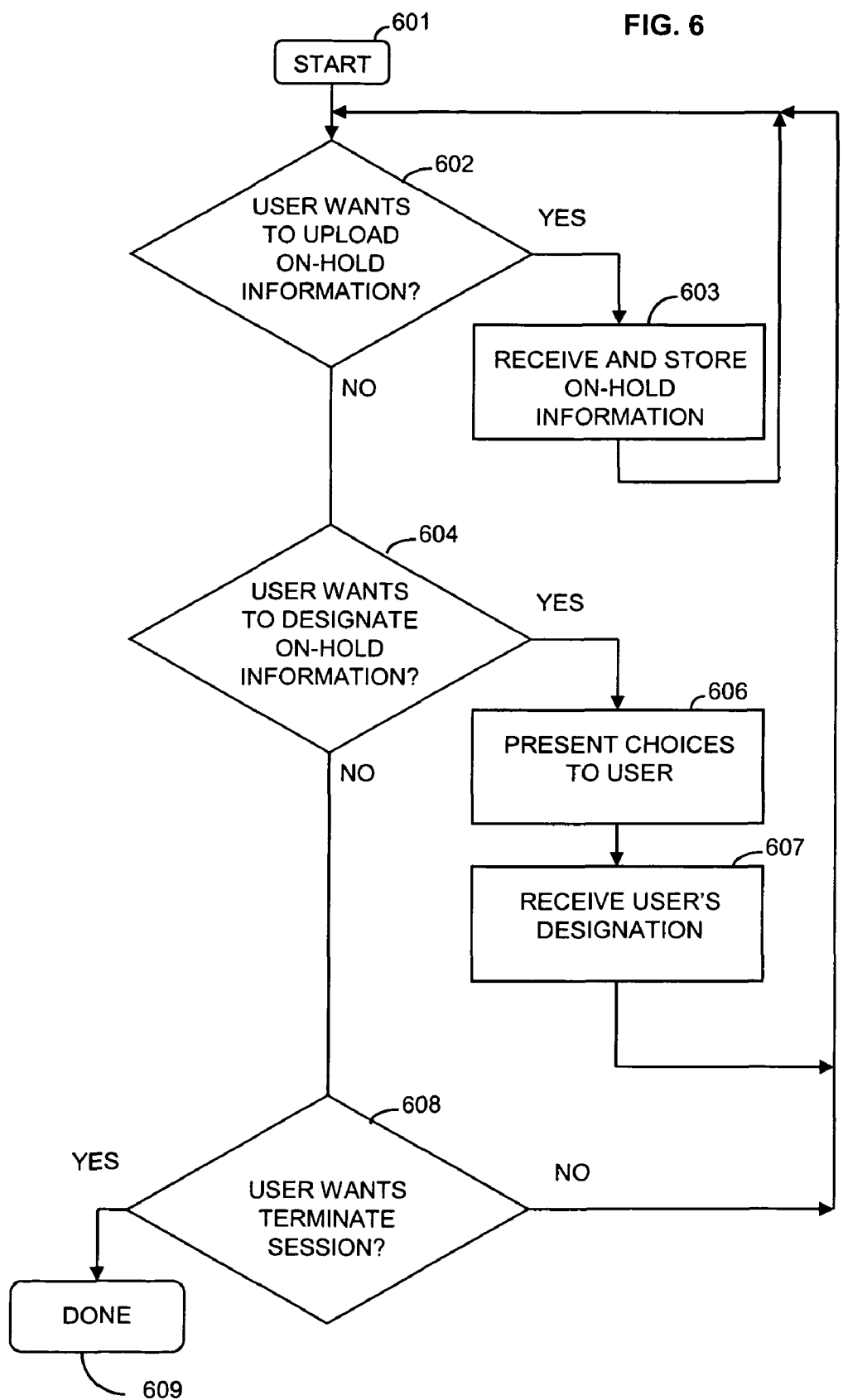
FIG. 6 illustrates, in flow chart form, operations for uploading and designating on-hold information that are performed by the embodiments

FIG. 6 illustrates, in flowchart form, operations that may be performed by a telephone or a telecommunication switching system for uploading on-hold information and for allowing the user of a telephone to designate what on-hold information will be used for on-hold messages by the user. After being started in block 601, decision block 602 determines if the user has requested to upload on-hold information. If the answer is yes, block 603 receives and stores the on-hold information that is being transmitted by the user before transferring control back to decision block 602.

If the answer in decision block 602 is no, decision block 604 determines if the user is requesting to be allowed to designate what on-hold information will be presented to the user when the user is placed on hold. If the answer is yes, block 606 presents the choices that are available to the user, and block 607 receives the user's designation of which of these choices will be used by the user before transferring control back to decision block 602.

If the answer in decision block 604 is no, decision block 608 determines if the user wants to terminate the session. If the answer is no, control is transferred back to decision block 602. If the answer in decision block 608 is yes, the session ends by execution of block 609.

When the operations of an IP telephone set, control computer or monitor computer are implemented in software, it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The IP telephone set, control computer or monitor computer can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store the program for use by or in connection with the instruction execution system, apparatus, or device. For example, the computer-readable medium can be, but is not limited to, an electronic, magnetic, optical, electromagnetic, infrared, or semiconductor system, apparatus, or device. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

In an alternative embodiment, where IP telephone set, control computer or monitor computer is implemented in hardware, IP telephone set, control computer or monitor computer can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Of course, various changes and modifications to the illustrated embodiments described above will be apparent to those skilled in the art. These changes and modifications can be made without departing from the spirit and scope of the invention and without diminishing its intending advantages. It is therefore intended that such changes and modifications be covered by the following claims except insofar as limited by the prior art.

What is claimed is:

1. A method for providing on-hold information to a TTY (telecommunication device for the deaf) telecommunication terminal that has been placed on-hold during a telecommunication call, comprising:
   receiving a message designating that the TTY telecommunication terminal is to be placed on-hold from a far-end of the telecommunication call;
   transmitting an on-hold message to the user of the TTY telecommunication terminal where the on-hold message is selected by the user during a period of time that the telecommunication terminal is on-hold and generated at a near-end telecommunication switching system wherein the on-hold message is a TTY message.

2. The method of claim 1 wherein the on-hold message is pre-recorded.

3. The method of claim 1 wherein the on-hold message is pre-recorded by the user.

4. The method of claim 1 wherein the on-hold message is received via radio frequency transmission.

5. The method of claim 1 wherein the on-hold message is received via an Internet Service Provider.

6. Apparatus for implementing the operations of claim 1.

7. A non-transitory computer-readable medium for providing on-hold information to a TTY (telecommunication device for the deaf) telecommunication terminal that has been placed on-hold during a telecommunication call, comprising computer-executable instructions, which when executed by a computer, perform the operations of:
   receiving a message designating that the TTY telecommunication terminal is to be placed on-hold from a far-end of the telecommunication call;
   transmitting an on-hold message to the user of the TTY telecommunication terminal where the on-hold message is selected by the user during a period of time that the TTY telecommunication terminal is on-hold and generated at a near-end telecommunication switching system wherein the on-hold message is a TTY message.

8. The non-transitory computer-readable medium of claim 7 wherein the near-end telecommunication switching system is a circuit switching system.

9. The non-transitory computer-readable medium of claim 7 wherein the on-hold message is pre-recorded.

10. The non-transitory computer-readable medium of claim 7 wherein the on-hold message is pre-recorded by the user.

11. The non-transitory computer-readable medium of claim 7 wherein the on-hold message is received via radio frequency transmission.

12. The non-transitory computer-readable medium of claim 7 wherein the on-hold message is received via an Internet Service Provider.

* * * * *